March 20, 1956   F. T. JOHN ET AL   2,738,595
CLASSROOM COMMUNICATOR

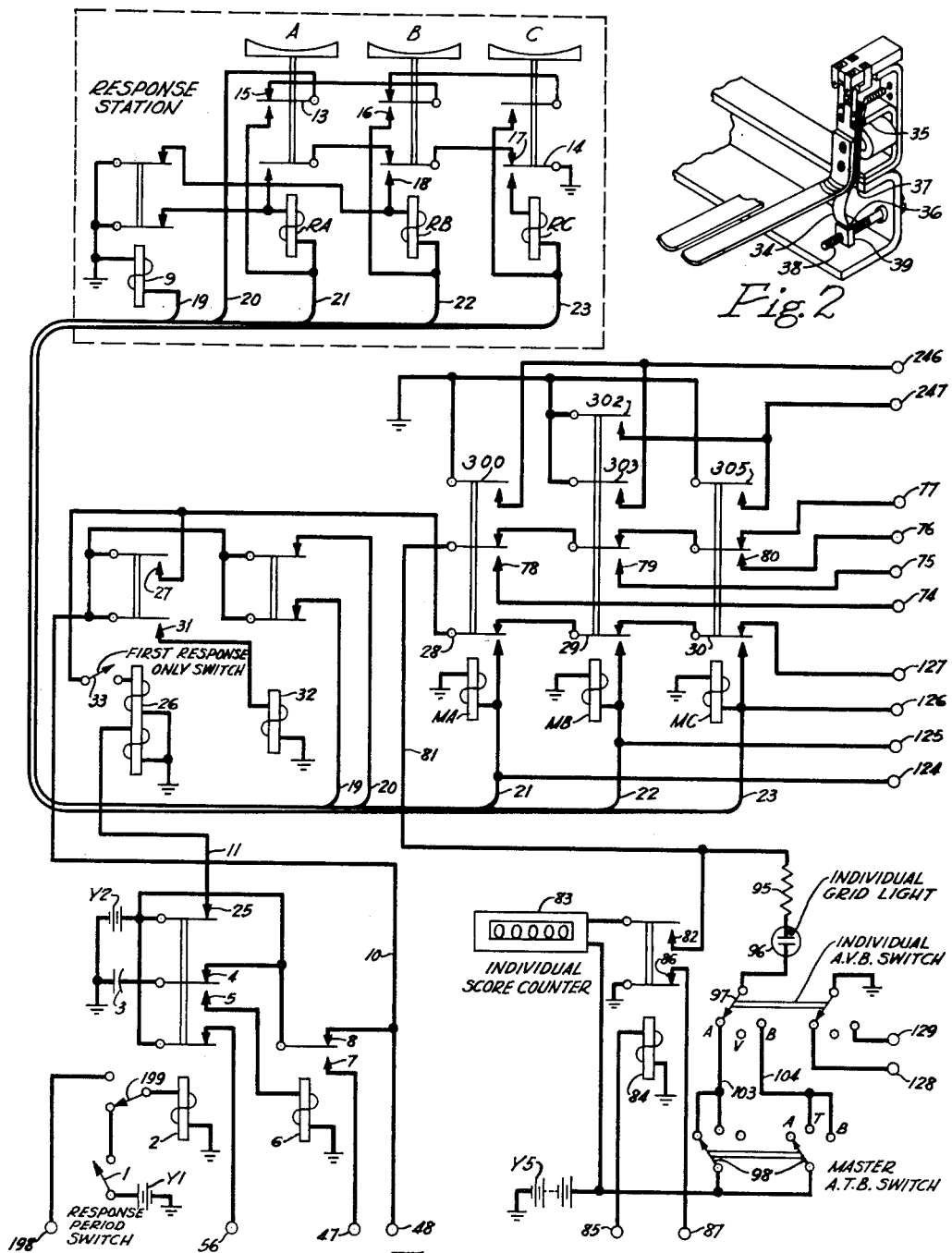

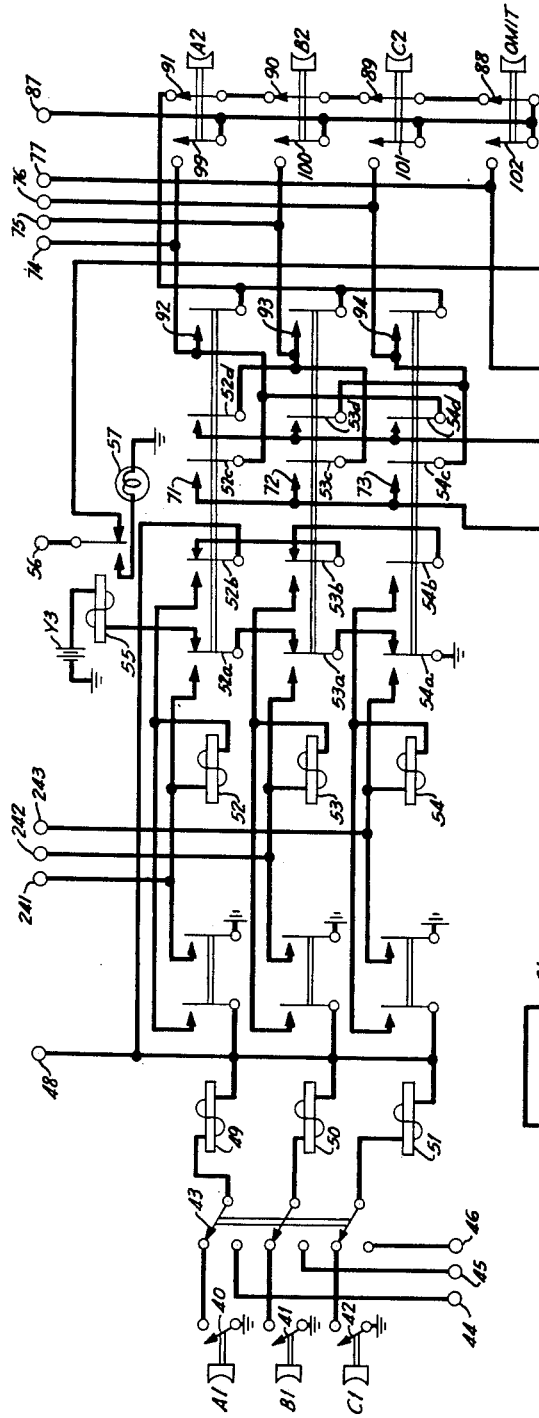

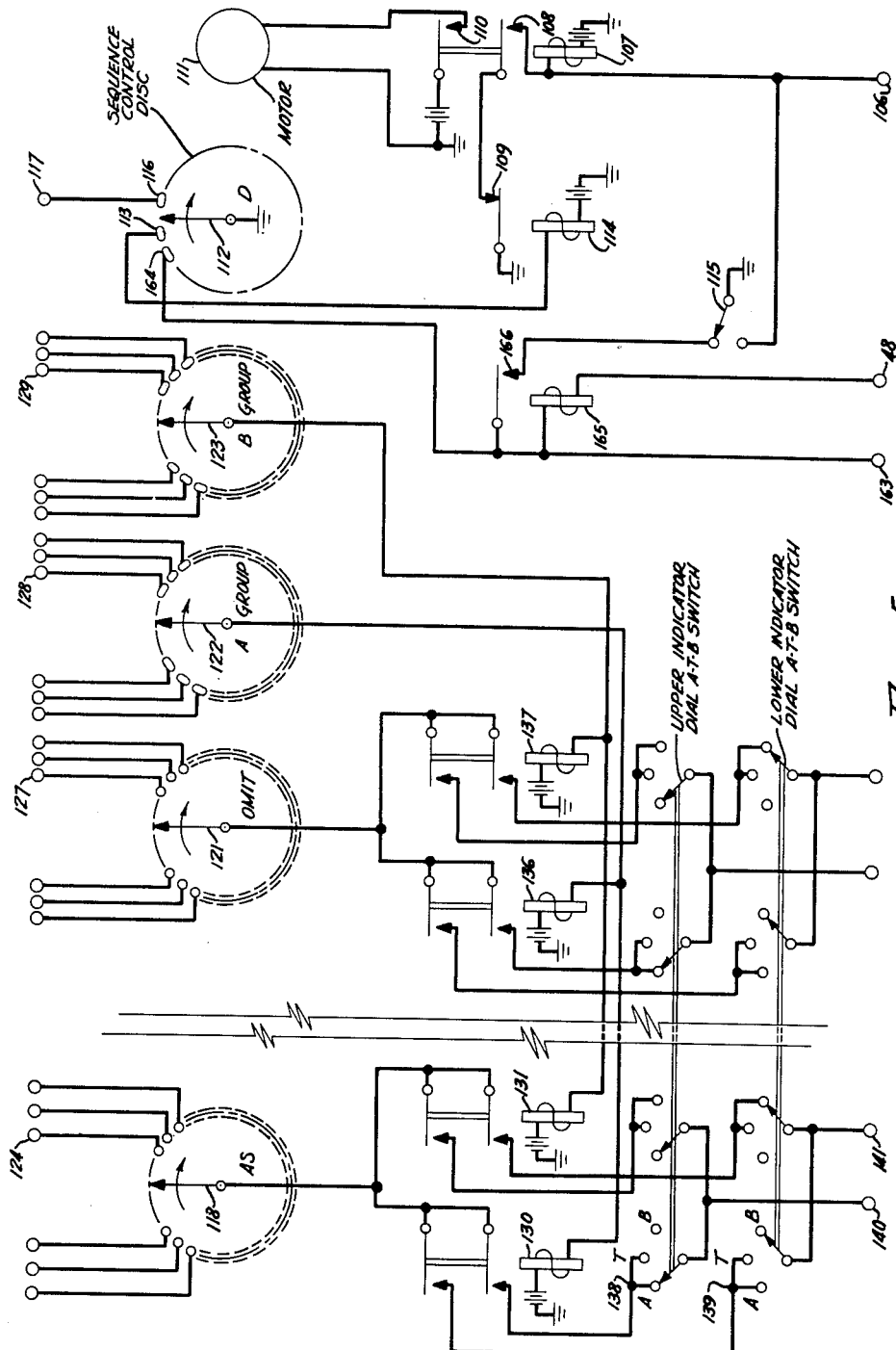

Filed April 5, 1952   9 Sheets-Sheet 6

INVENTORS
FRANK T. JOHN AND
BY JOHN B. CANNON, JR.

Brown, Critchlow, Flick & Peckham
Their ATTORNEYS

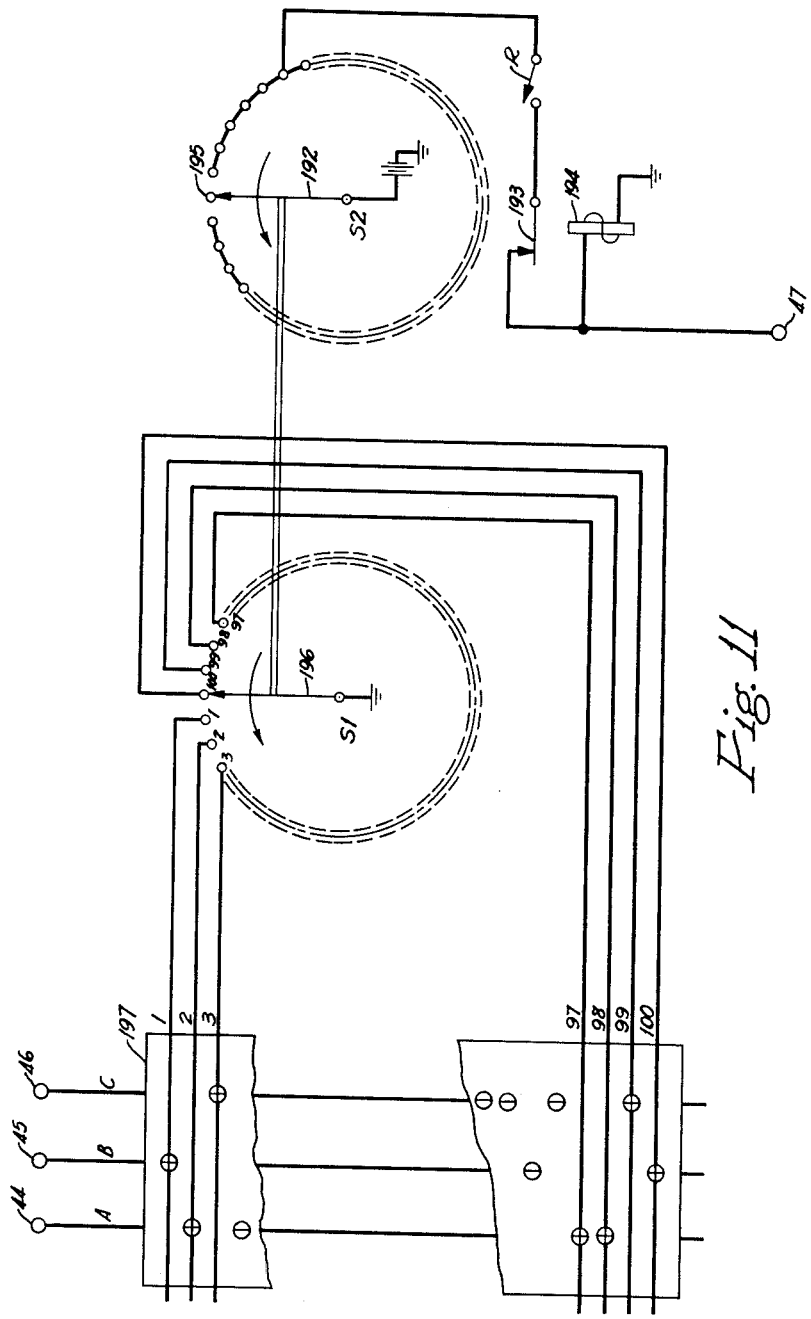

March 20, 1956     F. T. JOHN ET AL     2,738,595
CLASSROOM COMMUNICATOR
Filed April 5, 1952     9 Sheets-Sheet 8
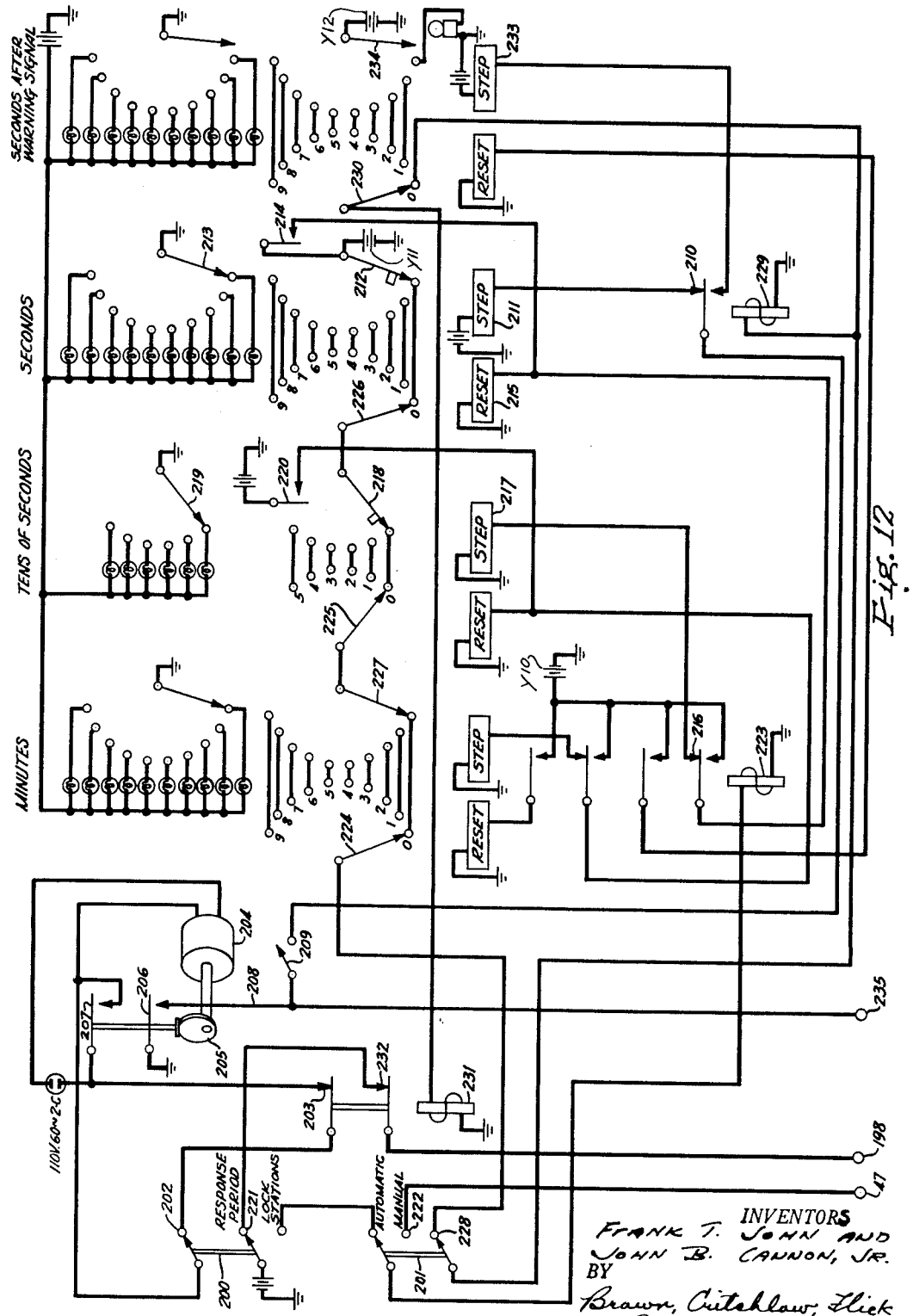
INVENTORS
FRANK T. JOHN AND
JOHN B. CANNON, JR.
BY
Brown, Critchlow, Flick
& Peckham
Their ATTORNEYS March 20, 1956
F. T. JOHN ET AL
2,738,595
CLASSROOM COMMUNICATOR
Filed April 5, 1952
9 Sheets-Sheet 9
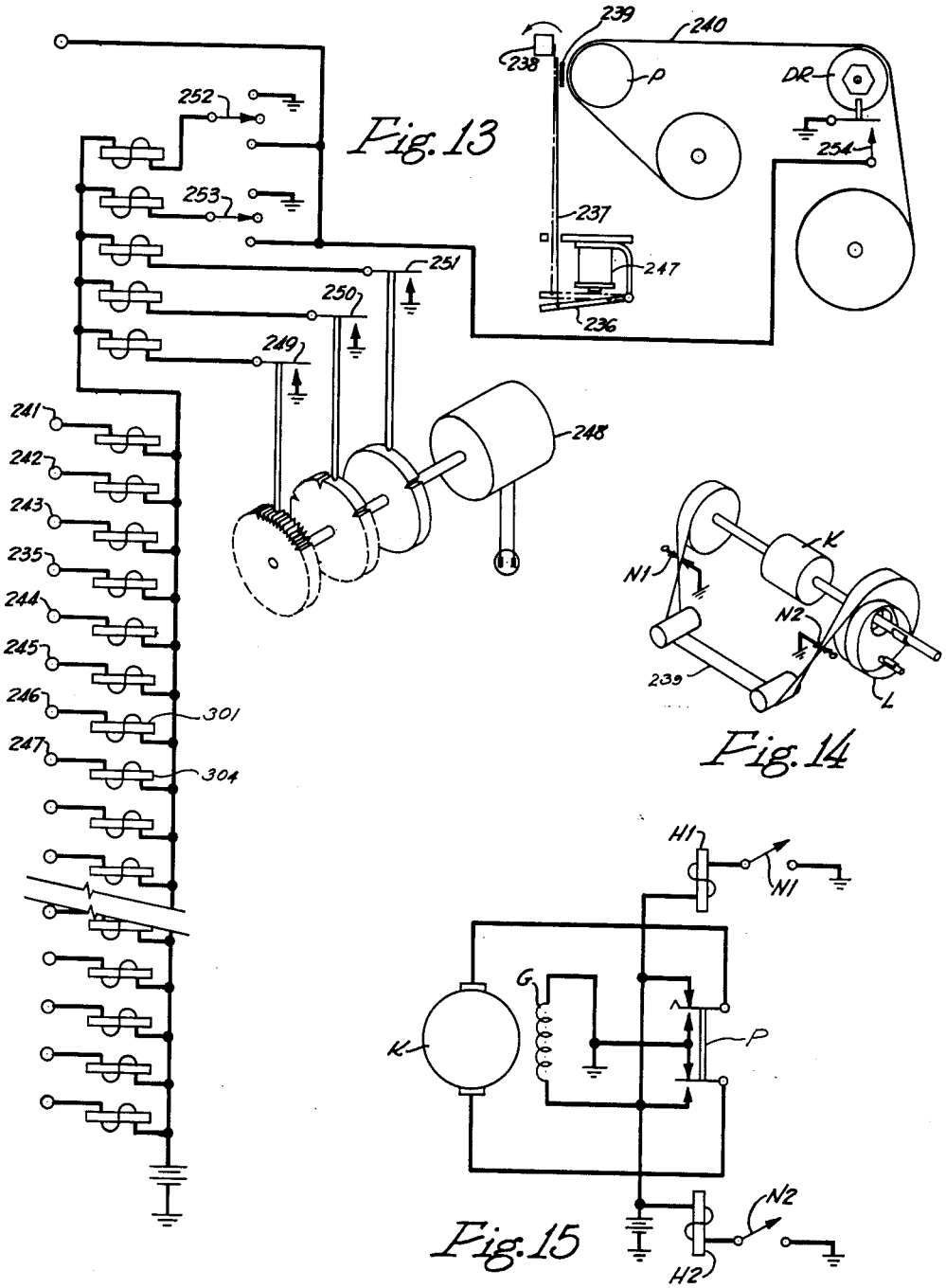
INVENTORS
FRANK T. JOHN AND
BY JOHN B. CANNON, JR.
Brown, Critchlow, Flick & Peckham
Their Attorneys United States Patent Office 2,738,595
Patented Mar. 20, 1956

2,738,595

CLASSROOM COMMUNICATOR

Frank T. John and John B. Cannon, Jr., State College, Pa., assignors, by mesne assignments, to Research Corporation, New York, N. Y., a corporation of New York Application April 5, 1952, Serial No. 280,794

17 Claims. (Cl. 35—48)

This invention relates to a classroom communicator for analyzing and recording the responses made by each individual in a group to a series of multiple choice situations, for the purpose of testing the correctness of their responses or analyzing their attitudes towards a series of events, or for other purposes.

It is accordingly among the objects of this invention to provide apparatus of the type referred to, which will analyze, measure, and record the reactions or responses of each individual in a group to a series of questions or events as to which there is a prescribed plurality of choices of responses; which will permit the individual, under controlled circumstances, to change his response within a predetermined period, but not thereafter, and at the same time avoid the possibility of double or multiple responses to any one question or event from any individual; which will scan the responses of the entire group to each event and promptly indicate to an observer the percentage of each type of response, including the correct response, if any, to each response-provoking event; which will provide such percentage indications on indicating devices that may be accurately and easily read under all degrees of illumination down to total darkness; which will record in permanent form each response and total the correct responses, of each individual during the test period; which will permit an observer to insert into the apparatus correct response information or data with respect to each response-provoking event; which will permit dividing the group into sub-groups, each containing any desired number of individuals, for comparing the responses of one group with those of another group; which will provide for the numerical weighting of the response choices, including the failure to make any response at all; and which will be adapted to continuously record the individual responses of the members of the group to various kinds of instruction and information programs for evaluating those programs.

The foregoing and other objects of the invention will be best understood from the following description of its preferred embodiment, reference being made to the accompanying drawings wherein:

Fig. 1 is a wiring diagram of a response station, showing the response relay circuit and its associated memory relay circuit, there being one such station for each individual in the group under observation; also shown are various control switches, operated by an observer or instructor, and other circuits associated with each response station;

Fig. 2 is an isometric drawing of a portion of a response station, showing certain details of one of the response keys and its associated response relay;

Fig. 3 is a circuit diagram of the correct response and multiple weighting circuits for inserting correct response data into the apparatus, and for weighting certain responses; this figure also shows the response scanning circuit for scanning individual responses from the response station;

Fig. 4 is a chart of multiple weight codes that may be used in operating the multiple weighting circuit;

Fig. 5 is a wiring diagram of a commutator circuit, and associated circuits, for scanning sequentially the various response choices of all response stations to a particular event, and for routing such data to numerical counters;

Fig. 6 is a circuit diagram of one of the numerical counters above referred to;

Fig. 11 is a circuit diagram of an automatic key-card device for automatically inserting correct response data into the apparatus;

Fig. 12 is a wiring diagram of a timer that may be used with the apparatus for timing the response period to any given event, or for limiting that period to a predetermined length of time;

Fig. 13 is a combined wiring diagram and schematic drawing of a printing circuit and printer used for recording responses;

Fig. 14 is an isometric view of a portion of the inked ribbon reversing mechanism used with the printer; and Fig. 15 is a wiring diagram of the ribbon reversing mechanism shown in Fig. 14.

Figure 6:
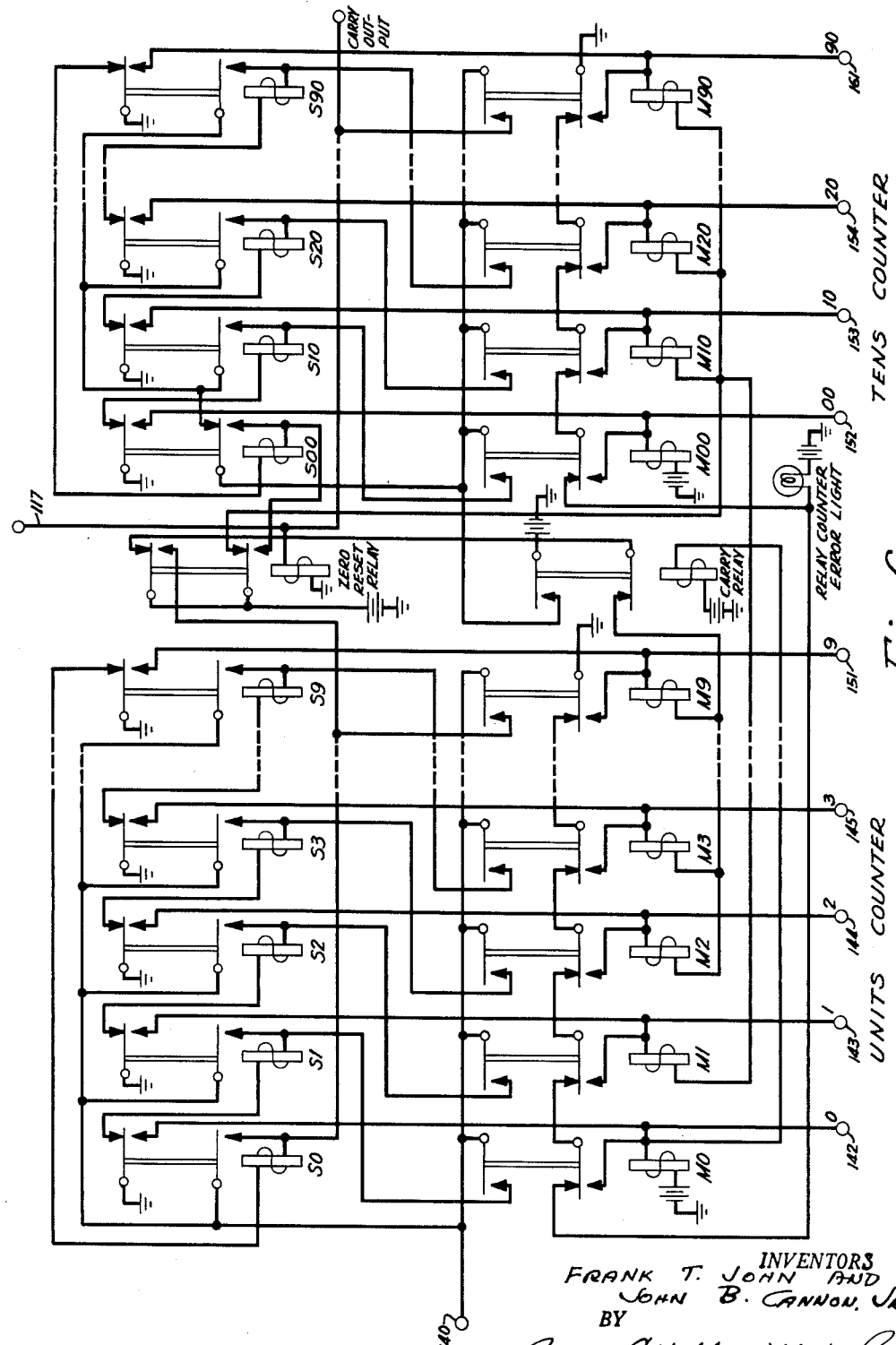

Most of the wiring diagrams show one or more relays, each relay including an energizing coil, and at least one switch having an armature and a normally open or closed contact. Where a relay is provided with more than one switch, their armatures are mechanically linked together in the usual manner. For convenience in drawing the circuit diagram, a plurality of sources of current are shown, each represented by a battery Y1, Y2, etc., one terminal of which is grounded and the other terminal connected to a live conductor. All of the relays are shown in their released positions, i. e., the positions assumed when no current is flowing through their energizing coils. On each sheet of drawings, there also appear one or more terminals, which also appear on one or more other sheets of drawings, to indicate that the circuits connected to similarly numbered terminals are electrically interconnected.

*The general system*

The classroom commutator system, embodying the inventions herein described, comprises a number of response stations, each operated by a different individual in a group whose responses and reactions are being analyzed or tested. Each response station is provided with a set of keys connected to appropriate relay circuits, by which each individual can manifest his choice of one response among a plurality of alternating responses, provision being made to allow the individual to change his response any number of times within a time limit determined by an instructor or observer. All of the response stations can be locked by the instructor after a response period of any desired length; and when they are so locked, the last alternative response chosen by each individual and manifested by depressing one or none of his response station keys cannot thereafter be changed. After all of the responses to a particular event or question have been tabulated and analyzed, the response stations may be unlocked to receive responses to the next question or event. The system can also present to the instructor, promptly after the response stations are locked, information as to how many individuals selected each alternative response and how many failed to make any response, as well as the percentage of the total group participating that selected each alternative response. The group under observation may be divided into two or more subgroups, such as an A group and a B group, and the foregoing information may be presented separately for each group at the same time, or for either group and both groups simultaneously, on two sets of indicators. Provision is also made for inserting into the system the correct response to any given question, either by manually operated relay means or by coded cards that automatically indicate the correct response to a given series of questions.

These and other features of the invention are explained herein in detail.

*The response station circuits*

The response station shown in Fig. 1 is one of a plurality of such stations, one for each individual in the group whose responses are being analyzed and recorded. Each response station is a device by which the individual may indicate his choice of alternative responses to a question or other stimulus. In the response station illustrated, three such possible alternative responses are provided for by the three piano-like keys A, B and C, but additional responses, represented by additional keys and relay circuits associated with each key, can be added if desired.

The initial conditions for operating the response station keys are created by closing a response period switch 1 (shown in the lower corner of Fig. 1), after a question has been put to the group. This one switch controls all response stations in the system through parallel circuit connections and permits current to flow from a battery Y1 to energize a response period relay 2. That relay is provided with three armatures, all of which move down when switch 2 is closed. A condenser 3 is closed. A condenser 3, which is charged by a battery Y2 through contact 4 before that contact is opened, will now discharge through closed contact 5 and deliver a pulse of current to the coil of a clearing relay 6, which will be energized only momentarily and for a period of time determined by the capacity of the condenser 3 and the characteristics of the relay 6. Preferably, clearing relay 6 should be energized for about one-quarter second, so that a pulse of current from battery Y2 is delivered through momentarily closed contact 7 to a terminal 47, which in turn delivers a pulse of current to other circuits referred to later. At the same time, contact 8 of relay 6 is momentarily opened, thereby disconnecting battery Y2 from all of the response station circuits connected to a common conductor 10 and clearing all relays previously energized by that battery. (The opening of contact 25 on the energizing of relay 2 disconnected that battery from another common conductor 11). When relay 6 is released a moment later by the ending of the pulse of current from condenser 3, contact 8 is again closed. Control relay 9, alone of all the relays shown in Fig. 1, will now be energized by current from battery Y2 flowing through closed contact 8, conductor 10, the normally closed lower switch of another control relay 32, and a conductor 19, so that the two switches of relay 9 will be open.

Assume that, when the question was put to the group before the closing of switch 1, three alternative responses, only one of which is correct, were suggested by the instructor as possible answers to that question. Assume further that individual X is operating the particular response station shown in Fig. 1, which is identical with all of the others, and that he chooses response B as his answer. He manifests that choice by depresing key B, shown at the top of the drawing. Since key B is mechanically linked to the armatures of a response relay RB (keys A and C are similarly linked to the armatures of response relays RA and RC, respectively), those armatures will move down, closing contacts 16 and 18. Current will now flow from battery Y2 through closed contact 8, conductor 10, the upper switch of control relay 32, a conductor 20, normally closed contact 15 of response relay RA and now closed contact 16 of response relay RB to the coil of this last relay. That coil is also connected to ground through now closed contact 18 of the same relay and normally closed contact 17 of response relay RC. Relay RB is accordingly energized; and in addition, it is locked in holding circuit connection with its source of current supply, so that it will remain energized, and key B will remain in its down position, even after individual X takes his finger off that key.

As soon as response relay RB is energized, a corresponding memory relay MB (shown in the middle of Fig. 1) is also energized by current from battery Y2 passing through a conductor 22 connected to the battery side of the coil of relay RB; and the armatures associated with memory relay MB move down.

If individual X wishes to change his response, he can do so by depressing either key A or key C. In either case, relay RB and its associated memory relay MB will then be released, and key B will return to its up position. For example, if key A is now depressed, contact 15 of its associated relay RA is opened, disconnecting relay RB from battery Y2 and releasing the latter relay and its memory relay MB; and key A would then lock down through its response relay RA, and its associated memory relay MA would be energized. If key C is depressed instead of key A, contact 17 of its associated response relay RC is opened, disconnecting relay RB from ground and releasing that relay and relay MB; and key C will lock down through its relay RC, and its associated memory relay MC will be energized. It will be apparent from the circuit of the response station that keys A, B, C can be pushed down successively in any desired sequence and that only the key last depressed will then remain locked down through its response relay, and its associated memory relay will also be energized. It will also be apparent that, if individual X depresses two or more keys at the same time, none of them will lock down, although one memory relay [MA] will be energized. However, individual X will be aware that he has made the mistake of pushing down more than one key at the same time by the fact that none of the keys in his response station remains down after manual pressure thereon is released.

When the instructor believes that the response period has lasted long enough for the various individuals in the group to have made up their minds about what response to make and to have manifested their response by depressing the appropriate response station key, response period switch 1 is opened to lock all of the response stations in their then existing condition. The locking of individual X's response station is typical of the locking of the other response stations and is accomplished as follows: With the opening of switch 1, response period relay 2 is released and its three armatures move up. Current now flows through the upper armature from battery Y2 through closed contact 25 and conductor 11 (common to all of the response stations) to the lower coil of a locking relay 26 (there is one such relay for each response station), which is also connected to ground. Locking relay 26 is accordingly energized, and its two armatures move down to close normally open contacts 27 and 31. With the closing of contact 27 current from battery Y2 flows through closed contact 8 of clearing relay 6, conductor 10, now closed contact 27 of locking relay 26, and locks one of the memory relays. Assuming that individual X had manifested a final choice of response A, current flows through armature 28 of the first memory relay MA and locks that relay, because it was already energized by the locking down of key A and its response relay RA before the end of the response period. Memory relay MA is, accordingly, no longer dependent on battery current in conductor 21 through closed contact 15 of response relay RA.

At the same time that memory relay MA is locked, current from battery Y2 flows through now closed contact 31 of locking relay 26 to energize control relay 32; and the two switches of that relay open, disconnecting conductors 19 and 20 from battery Y2. Those conductors lead to the response station; and, when they are disconnected from battery, individual X can no longer release depressed key A by depressing one of the other keys in his station, because battery current can no longer be supplied to response relays RB and RC. However, the absence of current in conductors 19 and 20 does not affect already locked-down response relay RA, and its associated locked-down key A, which now obtains battery current through conductor 21 from the closed armature 28 of memory relay and is also now connected to ground through the closed lower switch of control relay 9, which was released when conductor 19 was disconnected from the battery by the operation of control relay 32.

Accordingly, when the response period switch 1 is opened, key A stays down, held by its response relay RA; and its associated memory relay MA remains energized (the same would be true of key B or key C, and the relays associated with each, if one of those keys had been the last to lock down before switch 1 was opened). Key A cannot now be released by depressing either key B or key C, since its response relay RA is energized by a circuit that is independent of the circuits controlled by either of the other keys. The locking down of key A, during the period of locked stations in which switch 1 is open, also reminds individual X that he has chosen response A. This is an important feature in many teaching situations for which the apparatus is designed.

In some cases, it may be desirable to analyze the first response of each individual to a given question or situation. To make this possible, independently of the cooperation of the individuals being tested, there is provided a first response only switch 33 (adjacent to locking relay 26 in the left center of Fig. 1). When this switch is closed at the beginning of the response period (when switch 1 is also closed), the upper coil of locking relay 26 will receive battery current and then will be energized, as soon as any one of the keys in the response station is depressed and its associated response and memory relays are energized. For example, if key B is depressed to lock response relay RB and memory relay MB, conductor 22 will carry battery current through armature 29 of memory relay MB and armature 28 of memory relay MA to the upper coil of locking relay 26. When relay 26 is energized through its upper coil, the response station is locked in the same way as previously described when the opening of switch 1 energized the lower coil of the same relay. It should be noted, however, that while the lower coils of all of the locking relays 26 may be connected in parallel to conductor 11, so that all of the response stations may be locked simultaneously at the end of the response period, the upper coils of those relays cannot be so interconnected by a common conductor. If they were, the first response made at any response station would lock all of the stations in the system in the same way as the opening of switch 1. To prevent this from happening, there must be a first response switch 33 for each response station or, the more practical equivalent of such switches, a single multi-contact switch 33, having an electrically separate contact for each response station.

In Fig. 2 is shown the structure of a portion of one of the keys in a response station. It is desirable that, when any key is in its up position (when its associated response relay is released), it will be held up by a spring force great enough not only to support the weight of the key but also to resist accidental light touches of the individual's fingers that might inadvertently depress the key and close its associated relay circuit. On the other hand, when the key is in its down position, this spring force would be sufficiently small to permit a relay of reasonable size to hold the key down. An ordinary compression spring for returning the key to its up position would not accomplish this purpose, because the resisting force of the spring increases as the key is depressed. Accordingly, as shown in Fig. 2, a spring 34 is mounted to engage the key with a toggle-like action. Spring 34 is a leaf spring bent into an arch and is so mounted that when the key is down the force of the spring is largely directed along the straight line connecting the pivot point 35 of the key and armature with the fulcrum of the spring 36, i. e., the point of contact 37 beween the spring and key is above, but very slightly above, the above-mentioned straight line, so that the principal force of the spring is directed along a line substantially parallel to the armature, and very litttle force is exerted in a direction normal to that line, tending to raise the key. Under those conditions, the key can be maintained in its down position by the electromagnetic force of a small relay coil drawing only a small current. When that relay is released, there is sufficient upward pressure exerted by the spring to raise the key; and when the key is in its up position, the point of contact 37 between the spring and key is well above the line joining the fulcrum of the spring and the pivot of the key, so that a greater component of the spring force is directed upward. The fulcrum end of spring 34 may be supported on an adjusting screw 38 by a nut 39, so that the position of the fulcrum spring can be adjusted to obtain the desired force components described above. With this spring arrangement the resistance of the spring 34 to the depression of the key is greatest when the key is up and decreases to a minimum as the key moves down.

From the description so far given, it will be apparent that whenever the response stations are locked by the opening of response period switch 1, one of the three memory relays MA, MB, or MC, associated with each response station will be energized if, and only if, one of the response keys has been depressed in that station before the end of the response period. The various output terminals that are shown on the right-hand side of Fig. 1 and numbered 74 to 77, inclusive, as well as those numbered 124 to 127, inclusive, are connected to other circuits in the system for scoring the correct responses of each individual and for scanning all responses of the group at the end of each response period, in the manner and for the purposes hereinafter described.

*Correct response circuit*

The circuit shown in Fig. 3 permits the insertion of correct response data in the apparatus during or after each response period by pushing in one of three correct response keys, A1, B1, or C1, appearing on the left-hand side of that figure, thereby closing the correct response switches 40, 41, and 42, respectively. When the correct response data is inserted manually, as just described, a control switch 43 is in the position shown in the drawing. When that data, on the other hand, is inserted through an automatic key card circuit, to be separately described, the control switch 43 is pushed down to engage its lower contact points.

Control relays 49, 50, and 51 are operated by the keys A1, B1, and C1, respectively, and may be selectively energized by pushing in the appropriate key (closing is associated switch), either druing of after the response period, except for a brief instant at the beginning of the response period when battery current is removed from input terminal 48 just after the closing of response period switch 1 (see Fig. 1). As previously described, the closing of switch 1 momentarily energizes clearing relay 6 and opens its contact 8 to interrupt the flow of current from battery Y2 to output terminal 48.

It has been assumed that the final response made by individual X during a particular response periad was an A response. Assume further that this response is the correct one to the question given to the group and that the instructor has inserted that information in the system by pushing in key A1 in Fig. 3, either during or after the response period. Switch 40 will then be closed, connecting ground to the coil of control relay 49, which, as already pointed out, receives current from battery Y2 through terminal 48. Relay 49 will accordingly be energized, closing its two switches, which in turn energize correct response relay 52. It will be noted that relay 52, and the similar relays 53 and 54, are interconnected through their respective switches 52a and b, etc., to a source of current supply (terminal 48) and to ground (through contact 54a) in the same manner as the response relays RA, RB, and RC in the response stations. In other words, correct response key A1 need be depressed only for a short instant, and control relay 49 need be only momentarily energized, to insert the correct response in the system, because of the locking feature of relay 52. The same is true of keys B1 and C1 and their relays 53 and 54, respectively. It follows therefore that, if one of the keys A1, B1, or C1 is incorrectly pushed, that mistake can be corrected by pushing one of the other correct response keys, releasing the earlier pushed key in the same manner as the response keys, in each response station, may be successively depressed and released. Once a correct response relay 52, 53, or 54 is locked, it will remain locked until another of those same relays is energized or until the current through terminal 48 is interrupted by the opening or contact 8 (in Fig. 1) at the beginning of the next response period.

Now it is desirable that the scoring operations to be described below do not begin before the response stations are locked and a correct answer has been put into the system. It is also desirable that a correct response be selected, i. e., that one of the correct response relays 52, 53, or 54 be energized, before or at the same time as the response stations are locked, so that the scoring operations can begin promptly. A control relay 55 (at the top center of Fig. 3) is provided to satisfy both of those conditions. The coil of that relay is connected to a battery Y3 and also connected to ground through the normally closed contacts 52a, 53a, and 54a of relays 52, 53, and 54, respectively. It will be clear from this circuit that relay 55 will be energized so long as no correct answer has been inserted in the system and that, as soon as one of the relays 52, 53, or 54 is energized, the ground connection to relay 55 will be broken and that relay will release. Terminal 56, connected to the armature of relay 55, receives current from battery Y2 in Fig. 1 only at the end of the response period, when switch 1 is opened and relay 2 is released. If relay 55 is energized when that occurs, current will then flow from terminal 56 to a warning lamp 57, indicating to the instructor that correct response data has not yet been inserted in the system. On the other hand, if correct response data has already been inserted before the end of the response period, thereby energizing one of the relays 52, 53, or 54 and releasing control relay 55, lamp 57 will not light at the end of the response period. Instead, current from battery Y2 in Fig. 1 will flow from terminal 56 to a starting relay 58, located at the bottom of Fig. 3 (that relay will also be energized when the correct response data is inserted after, rather than before, the end of the response period).

When starting relay 58 is energized in the manner above described, it starts the individual scoring operations. For certain statistical purposes, it is frequently desirable to weight each alternative response in accordance with recognized multiple weighting codes. To accomplish this function, the apparatus is provided with a multiple weighting circuit, which includes starting relay 58, a rotary stepping switch W1, and its associated multiple weighting switches W2 and W3, so connected in the circuit that their respective wiper arms will make one complete revolution upon receiving a single starting pulse when relay 58 is energized. As the armature of relay 58 moves down, a charged condenser 59 will discharge a pulse of current to an impulse relay 60, which is momentarily energized, and its two normally open contacts 62 and 105 are momentarily closed. With the closing of contact 62, current from a battery Y4 is delivered through the wiper arm of stepping switch W1 to a contact 61 of that switch, and then through momentarily closed contact 62 of impulse relay 60 and normally closed contact 63 of a stepping relay 64 to the coil of that last relay, which is thereby momentarily energized. As the armature of this last relay moves to the left, it operates a ratchet (not shown on the drawing) to turn the wiper arm of stepping switch W1 one position clockwise, so that the arm now engages contact 65. At the same time, the movement of the armature opens contact 63 to interrupt the energizing circuit, and relay 64 releases. As it releases, contact 63 closes and, at the same time, resets the ratchet to its initial position. Impulse relay 60, which was only momentarily energized, may now be released, and its contact 62 may open without affecting the further operation of the stepping switch W1. Current can now flow from battery Y4 through contact 65 and the subsequent interconnected contacts of stepping switch W1 through now closed contact 63. Relay 64 will accordingly be energized once more, and turn the wiper arm of switch W1 another position clockwise, to engage the contact adjacent to contact 65. Relay 64 then breaks its own energizing circuit and is again released. This operation continues until the wiper arm of switch W1 has made a complete revolution, successively engaging all of the contacts shown in the drawing. When the wiper arm returns to its initial position engaging contact 61, stepping relay 64 will not be further energized until normally open contact 62 of impulse relay 60 is again closed by a pulse of current from condenser 59. That pulse does not occur until after starting relay 58 is first released (at the beginning of the next response period) and again energized (after the next response period has ended and correct response data has been inserted in the system).

Associated with the stepping switch W1 are the two multiple weighting switches W2 and W3, having wiper arms 68 and 66, respectively, which are mechanically connected to the wiper arm of switch W1. Wiper arm 66, in the course of one revolution, delivers a single ground pulse to a conductor 67, while arm 68 delivers two such pulses to a conductor 69.

If the multiple weight switch 70 is open, as it is shown to be on the drawing, only the single ground pulse delivered to conductor 67 is transmitted to the rest of the circuit, and no response is weighted relative to another response. That pulse will be routed through one of the closed contacts 71, 72, or 73, controlled by correct response relays 52, 53, and 54, respectively, depending upon which one (and there can be only one) is energized, to one of the terminals 74, 75, or 76, shown at the top right of Fig. 3. Assuming that individual X manifested an A response and that this response was the correct one, this ground pulse will flow through conductor 67, closed contact 71, and terminal 74 to the memory relay circuit shown in Fig. 1. There it will flow through closed contact 78 of memory relay MA to a conductor 81, then through closed conatct 82 of a control relay 84 to an individual score counter 83, which will register one unit, indicating that individual X has made a correct response.

It will be noted that control relay 84 is energized to close its contact 82 and open its contact 86 by current from battery Y4 (in Fig. 3) as soon as the stepping switch W1 begins to operate and remains energized during the operation of that switch.

It will be clear from the circuit diagram of Fig. 1 that if individual X had made any other response than response A, or had failed to make any response at all, contact 78 of memory relay MA would be open, and the ground pulse transmitted through terminal 74 would not be transmitted to the score counter 83, thereby indicating that he had made an incorrect response or had failed to respond.

If, on the other hand, the multiple weight switch 70 is closed when the stepping switch begins its cycle, the single ground pulse delivered to conductor 67 will still be routed through one of the contacts 71, 72, or 73, as previously described, so that a correct response in any response station will cause the individual score counter 83 associated with that station to register one unit. But now, if an incorrect response has been locked in that station, the score counter may be advanced two, one, or no units, in accordance with the multiple weighting code shown in Fig. 4. This happens as follows. The single ground pulse delivered to conductor 67 also passes through multiple weight switch 70 to a terminal 77 (Figs. 1 and 3). In addition, two ground pulses from switch W2 are transmitted through conductor 69, closed switch 70, and through coding switches 52c and d, 53c and d, and 54c and d, to one of the terminals 74, 75, or 76, depending upon which correct response relay is energized. For example, suppose that individual X had made response B and that response A was the correct response. His individual score counter 83 would not be energized by any ground pulse from conductor 67 (routed to terminals 74 and 77), but would be operated twice by the two separated ground pulses from conductor 69, flowing through closed switch 52c (correct response relay 52 being energized, since response A is the correct response), through terminal 75, and through closed contact 79 of memory relay MB (Fig. 1) to counter 83, which will advance two units. That result is shown in the chart of Fig. 4, where the upper line shows the possible responses (including a failure to respond) that may be made by each individual; and the first vertical line shows the correct response. By following through the various circuits, it will be seen that failure of any individual to make a response advances his counter one unit, as does a correct response; and that if he makes an incorrect response, his counter either does not advance at all or advances two units.

*The response scanning circuits*

In the classroom communicator here described, the response data that is locked into each response station is present in a static form, i. e., in a particular configuration of open and closed relay contacts in the memory relay circuit associated with each response station. It has already been described how this information is scored, either with single or multiple weighting of responses, by routing a current pulse through the memory relay circuit to the individual score counter associated with each response station. It is usually desirable to convert that response data into other forms for the purpose of further analysis. This may be done by scanning the configuration of the relays in the memory circuit of each response station, as by the manual scanning keys A2, B2, C2 and Omit, shown on the right-hand side of Fig. 3, or by the automatic commutator scanning circuits shown in Fig. 5.

Referring first to the manual scanning keys shown on Fig. 3, it will be seen that those keys are interconnected with each other, and that each key is also connected to one of the terminals 74 to 77, inclusive, which are in turn connected to the similarly numbered output terminals of the memory relay circuit in each response stations (see Fig. 1). The scanning keys are further connected to a terminal 87 (at the top right of Fig. 3 and at the bottom right of Fig. 1), which is in turn connected to ground at all times, except when control relay 84 is energized during the scoring operation described above, i. e., when stepping switch W1 in Fig. 3 is operating. In other words, the scanning keys will not scan until the scoring operation is finished, when terminal 87 is reconnected to ground. If any one of the scanning keys A2, B2, etc., is then pushed in, an individual grid light 96 (see Fig. 1) will be lighted for each response station in which a corresponding response A, B, etc., has been made. All of those lights may be conveniently grouped in a panel before the instructor, so that he can tell at a glance, on successively pushing each of the scanning keys, which persons in the group have made an A response, a B response, a C response, or no response at all. For example, if individual X had made a B response, memory relay MB in Fig. 1 would be energized, and its contact 79 would be closed. If scanning key A2 is pushed in by the instructor to transmit a ground pulse from terminal 87 to terminal 74, that pulse will not be transmitted to the individual grid light 96 for X's response station. His lamp will not light, thereby indicating that he did not choose response A. The same result will follow if scanning keys C2 and Omit are successively pushed in by the instructor. However, when scanning key B2 is pushed in, a ground pulse will be delivered from terminal 87 to terminal 75 and then transmitted through closed contact 79 of memory relay MB, conductor 81, and a resistance 95 to the grid lamp 96. Battery current to that lamp is supplied by a battery Y5 through a master A-T-B switch and an individual A-V-B switch, as shown on Fig. 1. Accordingly, grid lamp 96 will light up to indicate that individual X has made a B response to the particular question put to the group during the response period.

It will be noted that the operation of the scanning keys A2, B2, etc., does not interfere with the operation of the individual score counter 83, since the scanning keys can operate effectively only when control relay 84 is released, while the individual score counter can be operated only when that relay is energized.

The manual switches in the lower right-hand corner of Fig. 1, the master A-T-B switch and the individual A-V-B switch, are used to divide a group under observation into various sub-groups for comparing their performances and reactions. The individual A-V-B switch, of which there is one for each response station, permits each station to be connected in an A group, a B group, or a V (vacant) group. The latter sub-group indicates that, regardless of whether or not the individual is present, his responses will not be scanned by any of the scanning operations herein described, although his response station and his individual score counter 83 will function normally. By the position of the individual A-V-B switch shown in Fig. 1, individual X has been put in the A group; if all response stations are likewise put in that group, then the sub-group is coextensive with the entire group. Contacts A and B of the individual A-V-B switch are connected by conductors 103 and 104, respectively, to certain contacts of the master A-T-B switch. As shown in Fig. 1, the latter switch is set (in its A position) to collect data from all response stations in the A group. If that switch is moved to the extreme right (to its B position), it will similarly collect data from all response stations in the B group. If the switch engages its middle contacts (its T, or total, position), it will collect data from the response stations in both the A and B groups, but not from any response station in the V (vacant) group.

A more complex, but very useful arrangement for scanning the responses in the various response stations at the end of each response period is shown in Fig. 5. Across the top of that figure appear a number of rotary commutator scanning switches, the wiper arms of which are adapted to be rotated by a motor 111. Each of the commutator switches are provided with as many contacts, each connected to separate terminals, as there are response stations in the system. The first commutator switch AS has each of its contacts connected to a terminal 124 of a different response station. As will appear from Fig. 1, terminal 124 will be connected to a source of battery current only when the memory relay MA in the response station is energized, i. e., when the individual operating the station has chosen response A.

Accordingly, as wiper arm 118 of switch AS makes one revolution, sequentially engaging each of its contacts, it will scan the configuration of the memory relays MA in all of the response stations; and it will transmit a pulse of current to the circuits below the commutator switch, whenever the wiper arm engages a contact that is connected to a response station in which that memory relay is closed, indicating that an A response was made by the individual operating that station. There are similar commutator switches (not shown in Fig. 5) for scanning terminals 125 and 126 of each response station, i. e., for scanning all of the B and C responses, respectively, made by members of the group. A fourth commutator switch, designated Omit, has its contacts connected to terminals 127 of the response stations for scanning those stations in which no response has been made.

Two other commutator switches, one designated A group and the other B group, have their contacts connected to terminals 128 and 129, respectively, of the individual A-V-B switches shown in Fig. 1, for dividing all of the scanned responses into those made by the A group and those made by the B group according to the particular group into which each particular response station has been placed.

At the same time as the stepping switch W1, shown in Fig. 3, begins to operate on the energizing of impulse relay 60, contact 105 of that relay is closed and delivers a ground pulse to a terminal 106. That same terminal is shown on the bottom right-hand corner of Fig. 5, and is connected to the coil of a motor control relay 107. That relay is accordingly energized whenever impulse relay 60 is energized, closing its two contacts 108 and 110. The closing of contact 108 locks relay 107, by providing an alternate conductor path to ground through normally closed contact 109 of a control relay 114. With the closing of contact 110 of relay 107, motor 111 is started and rotates the wiper arms of the commutator switches, and the wiper arm of the sequence control disc D, at a speed of about 25 R. P. M. through a gear reduction drive (not shown). The motor will continue to rotate until switch arm 112 of the sequence control disc D has completed one revolution and engages contact 113 on that disc. At that time, ground is connected through switch arm 112 and contact 113 to control relay 114, which is energized and opens its normally closed contact 109 to disconnect relay 107 from its holding circuit. The latter relay will then release and open the motor circuit, at which time the wiper arms of the various commutator switches and of the sequence control disc will be back in their initial positions. If it is desired to rescan the response stations before eliciting new responses to another question, motor 111 can be again energized to complete the cycle previously described by manually closing a spring return recount switch 115, which supplies a momentary ground connection to relay 107, energizing it, and causing it to lock in the same manner as did the current pulse through terminal 106.

When the scanning operation is first started, wiper arm 112 of the sequence control disc engages a contact 116 producing a ground pulse at terminal 117, which resets the numerical counters (one of which is shown in Fig. 6 and will be described later) to their zero positions. Thereafter, but not before (note the relatively greater spacing between the initial positions of the commutator wiper arms and the first contact each engages, as compared with the spacing between the initial position of arm 112 and its first contact 116), the commutator switches will scan the memory circuit terminals of the various response stations, as previously described.

The A Group and B Group commutator switches are provided with contacts that are circumferentially elongated to provide a contact of greater duration with their respective wiper arms 122 and 123 than is afforded by the corresponding contacts of the commutator switches for scanning the A, B, C and Omit responses.

As wiper arms 122 and 123 are rotated by motor 111, they scan terminals 128 and 129, respectively, of the individual A-V-B switches, as previously stated. For each response station, one of those terminals will be grounded, unless that response station has been placed in the vacant category. In other words, either arm 122 or arm 123 will receive a ground pulse from each response station, or neither will receive a pulse if that particular station is to be disregarded by having been placed in the vacant category. Each time that arm 123 of the B group, commutator switch receives a ground pulse, commutator relays 131 and 137, associated respectively with the A response commutator circuit and the Omit response commutator circuit (there are, of course, similar relays associated with the B and C response commutator switches that have been omitted from the drawings), will be energized, and their armature contacts will be closed. Each time that a ground pulse is received by arm 122 of the A group commutator switch, then relays 130 and 136 (again, there are similar relays for B and C response commutator switches), will be energized, and their armature contacts will be closed. Assuming that individual X, whose responses are here being followed, is in the A group and that he has made an A response, when the contact connected to terminal 124 of his response station is engaged by wiper arm 118 of commutator switch AS, a pulse of current will be transmitted from battery Y2 in Fig. 1 through arm 118 and the upper closed contact of relay 130 to conductor 138, and then through the closed A contact of a first manually operated A-T-B switch to output terminal 140. If individual X had been in the B group, that pulse would have been routed through the closed lower contact of relay 131 and the B contact of a second A-T-B switch to output terminal 141. Those two A-T-B switches are provided to combine or keep separate, as desired, the A group and B group responses scanned by each commutator, regardless of the group in which a particular response station was placed by the setting of its individual A-V-B switch.

There will accordingly be a total of eight output terminals for the four response scanning commutator switches (two of which are not shown). For each type of response (A, B, C, or Omit), there are two terminals, either or both of which may transmit random pulse data to separate relays counters and to other data analyzing circuits.

*Relay counter circuit*

The output terminals 140, 141, etc., from the commutator scanning switches shown in Fig. 5 are each connected to a separate relay counter. For the system shown, a total of eight such counters is required for counting a total of four possible responses from response stations in each of two sub-groups. Only one of those counters is shown in Fig. 6; but since they are all identical, a description of one will be sufficient. While any type of electrical counter may be used in the system, the one shown in Fig. 6 has many advantages, as fully described in a copending application of Frank T. John, one of the applicants herein, filed concurrently with this application.

Referring to Fig. 6, the counter includes a units set of impulse relays S0 to S9, arranged to operate successively in cyclic sequence upon the occurrence of each current pulse transmitted to the input terminal 140. There is also a set of corresponding holding or memory relays M0 to M9, equal in number to the number of impulse relays, and also arranged to be energized successively in cyclic sequence by a holding circuit. A second set of impulse and holding relays, S00 to S90 and M00 to M90, respectively, operate similarly on pulses generated by the first set at the end of each cycle and count tens.

The source of current for the holding circuit of both sets is a battery Y6 (in the middle of Fig. 6), current from which flows through the normally closed contacts of a zero reset relay to the holding relays in each set.

The first holding relay M0 in the units set (and relay M00 in the tens set) is energized by the closing of the zero reset relay, when the latter receives a ground pulse through terminal 117 (from Fig. 5, it will be seen that terminal 117 will be connected to ground through wiper arm 112 and contact 116 of the sequence control disc D before the various commutator scanning switches have engaged their first contacts). As soon as relay M0 is energized, it locks itself into the holding circuit. The first pulse input through terminal 140 will be routed through the upper switch of holding relay M0 to the coil of impulse relay S1. When that relay is energized, its upper switch delivers a ground pulse to the coil of holding relay M1. As the latter relay is energized, its upper switch connects impulse relay S2 to the pulse input terminal 140, but that relay can not receive a ground pulse and be energized until impulse relay S1 is released by the ending of the first pulse input. In addition, when relay M1 is energized, its lower switch disconnects relay M0 from the holding circuit and locks itself into that circuit. It will be clear from the counter circuit shown in Fig. 6 that subsequent impulses through terminal 140 will energize successive impulse relays in sequence and that the count at any time will be stored in one of the holding relays. When the tenth pulse input is received, holding relay M9 alone will be energized of all the relays in the units set. That tenth pulse will be routed through the upper switch of relay M9 to impulse relay S0, causing holding relay M0 to be energized and completing one cycle in the units counter set. At the same time, this tenth pulse will energize a carry relay, the lower switch of which will open to release holding relay M9, and the upper switch of which will close to send a new pulse to relay S10 in the tens counter set and energize that relay. When the latter relay is energized, its corresponding holding relay M19 is also energized, and is locked in the holding circuit to store a count of ten until the next tenth pulse is transmitted through terminal 140. Each succeeding tenth pulse will energize the next impulse relay in the tens set; and the hundredth pulse received by the counter will operate the zero reset relay to clear all relays in the counter, except relays M0 and M00 in the units and tens sets, respectively. The counter is then ready to repeat the sequences outlined above in counting the next hundred pulses. If it be assumed that there are ninety-nine response stations in the system, the counter may not count to its full capacity (unless all response stations contain the same response); but, in any event, it will be reset at the beginning of the next counting cycle by a pulse input through terminal 117, just before the commutator scanning switches in Fig. 5 begin their scanning operations after the conclusion of the next response period.

When the response count has been completed for any one response period, one or more of the counter terminals at the bottom of Fig. 6 will be connected to ground through their associated holding relays in which the completed count is stored. Assuming that all ninety-nine response stations are in a single group (the A group) and assuming further that an A response was made in all of those stations, then the counter shown in Fig. 6, which is counting the A responses from the A group of response stations, will have counted ninety-nine such responses. Accordingly, holding relays M9 and M90 will be energized, and their associated terminals 151 and 161, respectively, will be connected to ground. Those ground connections are then transmitted to similarly numbered input terminals in the translating and interpolating circuit shown in Fig. 7.

*Translating and interpolating circuit*

Figure 7:
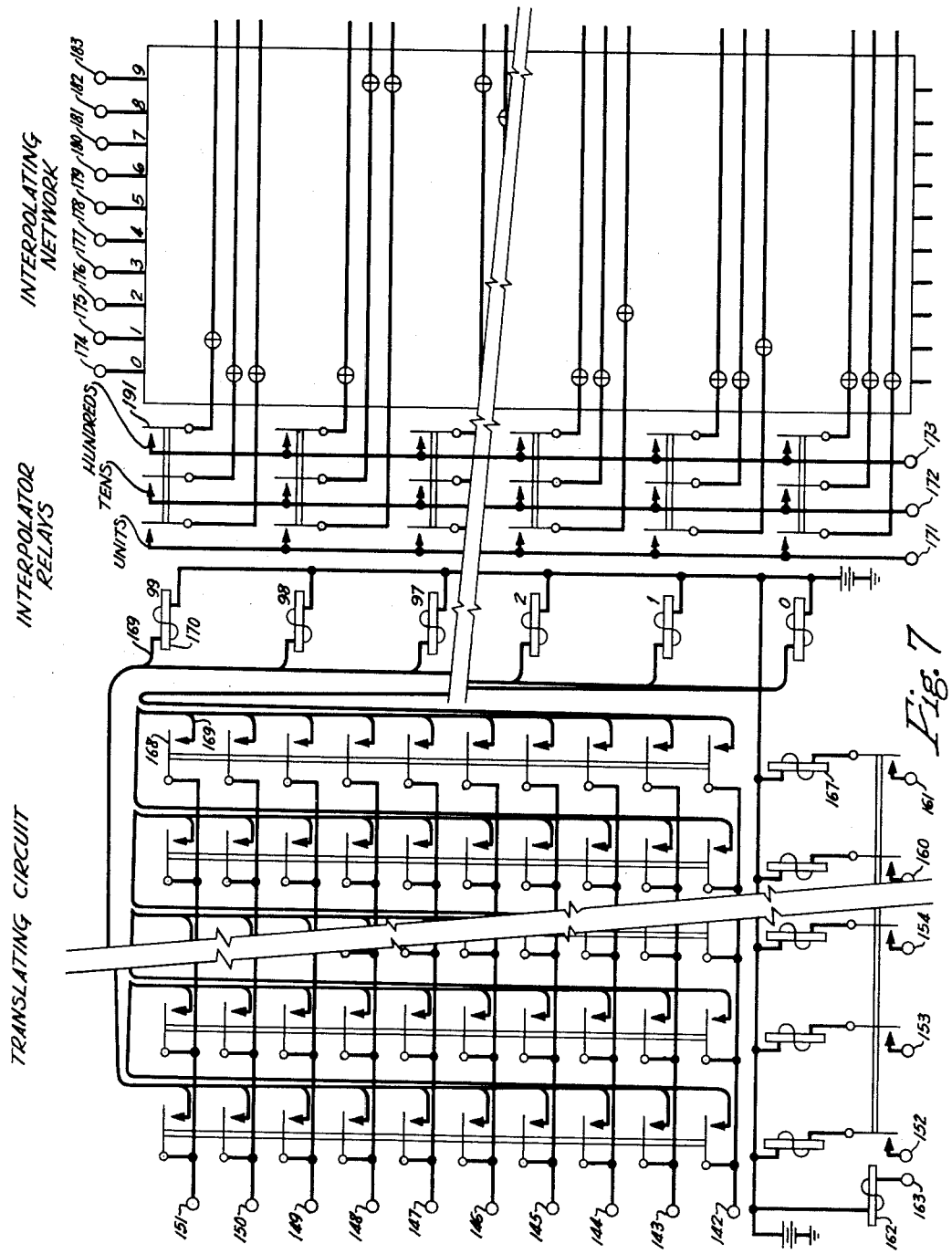
Fig. 7 is a circuit diagram of one of the translator and interpolator circuits, for receiving the counted responses from one of the counters and for translating and interpolating them into percentage figures.

The translating and interpolating circuit of Fig. 7 comprise an electrical computing network of relays, so interconnected that the ratio of the number of responses counted by one of the relay counters to the total number of possible responses is computed with great speed to the nearest whole percentage figure. That figure appears as an electrical output that may be transmitted to an appropriate indicator or printer for representing the figure in visible form.

There is one translating and interpolating circuit for each counter in the system. Assuming that the maximum capacity of the counter used is to count up to ninety-nine there will then be two electrical connections between the counter and its associated translating and interpolating circuit, one representing the units count and the other representing the tens count. Another data input to the circuit gives the total number of response stations, the responses of which are being counted. The latter data is inserted in the circuit in the form of a network card, there being one card for each possible total number of response stations. This card may be prepunched, or may have electrical contacts riveted in certain locations, or preferably it may take the form of conductors suitably interconnected in a network with the interconnections exposed in certain locations.

The operation of this circuit will now be described in detail.

Referring to Fig. 7, and assuming that there are ninety-nine response stations whose responses are being scanned and counted, that the circuit shown is handling the A responses of all the response stations, and that ninety-nine such responses were counted by the counter in Fig. 6, then terminal 161 at the bottom of Fig. 7 will be connected to ground, as will be apparent from Fig. 6, where that same terminal is connected to the counter circuit and is grounded when that circuit indicates a tens count of 90. Likewise, terminal 151 on the left-hand side of Fig. 7 will be connected to ground, because the similarly numbered terminal on Fig. 6 is grounded to indicate a units count of nine. A ground pulse will accordingly be delivered to the normally open extreme right-hand switch of translating relay 162. That relay will be energized and all of its switches will be closed, when terminal 163 connected to the coil of that relay is grounded. A ground connection is provided to that terminal (see Fig. 5) whenever wiper arm 112 of the sequence control disc D engages contact 164 on that disc at the end of the commutator scanning operation. At the same time, ground is also connected to relay 165 in Fig. 5, closing its contact 166 to lock relay 165 in its energized position. That relay provides an alternate ground connection to terminal 163 (through recount switch 115), which is maintained after arm 112 disengages from its contact 164. Accordingly, translating relay 162 in Fig. 7 will remain energized from the end of the scanning operation of one response period until the start of the next response period, when battery current will be disconnected from terminal 48 and relay 165 in Fig. 5 by the momentary opening of contact 8 of clearing relay 6 in Fig. 1. The locking circuit of relay 165 can be broken sooner, if desired, by pressing down the spring-return recount switch 115 in Fig. 5 to open the ground circuit to relay 162.

Accordingly, after one of the counters has completed its count, a translating relay 162 in the associated translating circuit will be energized. On the assumption that terminals 151 and 161, in Figs. 6 and 7, are grounded by a count of ninety-nine A responses in the A group of response stations, then network relay 167 will also be energized, closing its gang of switches (indicating a tens count of ninety). One of those switches 168 will be connected to ground through terminal 151 (indicating a units count of nine) and will transmit that ground connection to a conductor 169, connected to the coil of an interpolator relay 170, which is the ninety-ninth of a series of such relays, and that relay will be energized. It will be apparent from the grid network of interconnected switches in the translating circuit that there are one hundred unique configurations of those switches, each configuration being associated with a different interpolator relay corresponding to a count from zero to ninety-nine (i. e., to the maximum capacity of the counter). Accordingly, for every count made by one of the counters, its associated translating circuit will energize one, and only one, interpolator relay that is controlled by that circuit, and that relay will represent the total count of one of the alternative responses (A, B, C, or Omit) made by all individuals in the A group, in the B group, or in both groups, depending on the settings of the various A-V-B and A-T-B switches in the system.

Each interpolator relay, such as relay 170, closes three contacts, representing units, tens, and hundreds positions of the indicator dials, to be described later, and connects each contact to a pre-wired interpolating network card. A number of interchangeable network cards may be pre-wired to analyze the count in different ways. The interpolating network card shown in Fig. 7 is pre-wired to indicate the ratio (to the nearest whole number) between the total number of responses actually counted by one of the counters and the total possible number of such responses from all of the response stations to which that counter is connected through the commutator scanning circuits of Fig. 6. In other words, the network receives the count represented by the energization of a particular interpolator relay and interpolates that count into a percentage figure. It has been assumed that, out of a total of ninety-nine possible A responses in the A group of response stations, ninety-nine such responses were actually made and counted, i. e., that one hundred per cent of the group made an A response. When interpolator relay 170 is energized, as previously described, its contacts connect the following terminals in pairs: terminal 175 (shown above the interpolating network) to terminal 173 (shown at the lower left of the interpolating network), indicating a hundreds figure of one; terminal 174 to terminal 172, indicating a tens figure of zero; and also terminal 174 to terminal 171, indicating a units figure of zero.

It will be apparent from the portions of the interpolating network shown in Fig. 7 that, if ninety-eight responses had been counted, out of a possible total of ninety-nine responses, the percentage figure indicated would be ninety-nine per cent. If the total possible count were limited to fifty, or to any number other than ninety-nine, a different interpolating network card would have to be inserted in the system and would be pre-wired to give the proper percentage figure, representing the ratio between the number of responses actually counted and the total number of possible responses.

*Indicator dials*

The indicator dials forming part of this invention are devices that receive electrical data from the translating and interpolating circuits and convert those data into visible symbols. There will, accordingly, be one indicator for each translating and interpolating circuit, i. e., a total of eight dials for the system herein described, which has been purposely limited for simplicity to analyzing only four alternative responses (A, B, C and Omit) from each of two sub-groups of individuals.

Figure 9:
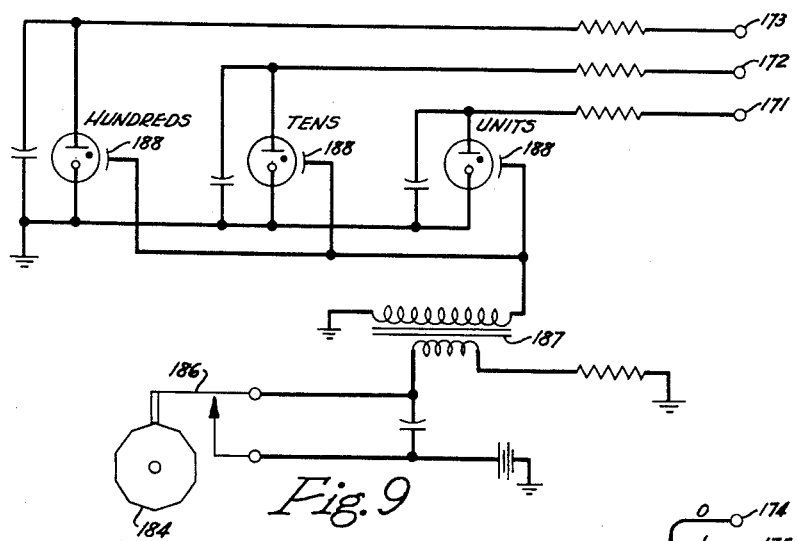
Figs. 8 and 9 are wiring diagrams of one of the indicators, for indicating the percentage interpolations referred to above.

In the way of general description, each indicator dial includes an oscillating or rotating member, which may be a disc or cylinder, bearing a series of symbols, such as numbered digits that are adapted to be made selectively visible by brief flashes of light. The mechanical movement of the member is such that each symbol thereon repeats its position in space in regular order and at regular intervals. In the preferred form of this device shown in Fig. 10, a hollow translucent cylinder 185 is provided with three spaced circumferential symbol bands, each band including opaque digit numerals from zero to nine, which are printed on, or otherwise affixed, to the surface of the cylinder. Inside the cylinder, in partitioned cells, are mounted a plurality of flashing light sources (not shown in the drawing), there being one such light source for each band of symbols on the cylinder. Each light source is preferably a miniature strobotron tube, which produces a brief, brilliant flash (see the circuit diagram of Fig. 9), whenever a low voltage is applied across its anode and cathode at the same time as a high voltage pulse is received by its trigger 118. The strobotrons associated with each cylinder are connected, as shown in Fig. 9, to the output terminals 171, 172 and 173, and 173 of the associated translating and interpolating circuit and are adapted to fire at selective periodic intervals, as described below, illuminating one of the symbols in one or more symbol bands on the surface of the rotating cylinder when the desired symbol is in line with a viewing window (not shown). The repeated brief illuminations of a particular symbol are so rapidly delivered that the motion of the cylinder appears to be frozen and the symbol appears to be stationary against an illuminated background.

Figure 10:
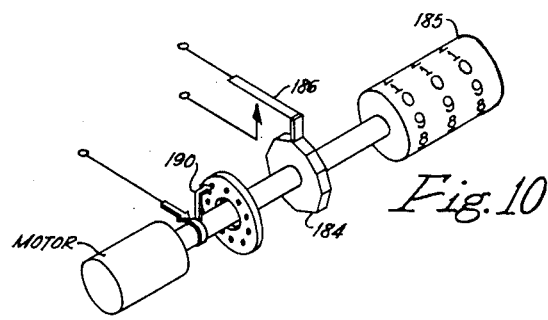
Fig. 10 is an isometric view of a portion of that indicator.
Figure 8:
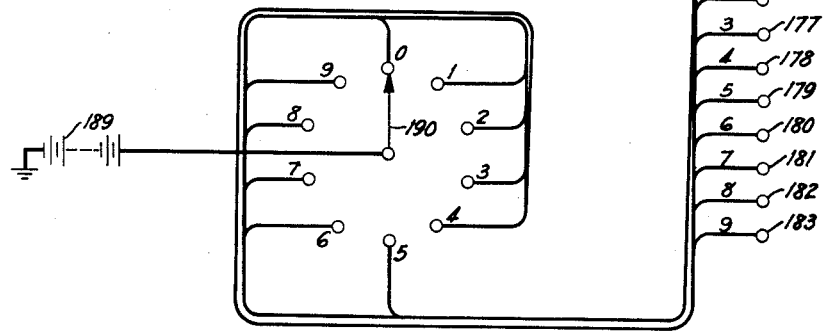

The cylinder 185 is rotated by a synchronous motor, as shown in Fig. 10, preferably at a speed of at least 30 to 40 R. P. S. to avoid flicker. A cam 184, operating a make-and-break switch 186, and a commutator switch 190 are also rotated in synchronism with the cylinder. In Figs. 8 and 9 are shown the circuit connections between those various elements and the strobotron tubes. The trigger 188 of each tube is connected through an ignition coil 187 and a make-and-break switch 186 with a source of current. The anode and cathode of each tube are shunted by a condenser and connected through a resistance to one of the terminals 171, 172 and 173, as shown in Fig. 9. Those same terminals are some of the output terminals of the translating and interpolating circuit, shown in Fig. 7; and as already described, one or more of those terminals will be connected to one or more of the output terminals 174 to 183 of the same circuit, depending upon which one of the interpolator relays in that circuit is energized after the completion of any count. The last mentioned terminals 174 to 183 are, in turn, connected, as shown in Fig. 8, to contacts numbered 0 to 9 representing those unit values, commutator switch 190, the wiper arm of which is connected to a source of current 189.

As cam 184 rotates in synchronism with cylinder 185, the cam opens the make-and-break switch 186 and energizes the primary of the ignition coil 187 each time a particular numeral on the cylinder is in alignment with its viewing window. This produces a very brief, high voltage (about 18 kv.) pulse in the secondary of the ignition coil that is applied to the external trigger 188 of each strobotron lamp. No lamp can fire, however, unless a lower voltage from battery 189 (see Fig. 8) is applied across its anode and cathode at the same time as the high voltage pulse is received by its trigger 188. The desired selective coincidence of these potentials is obtained through the interconnections of the interpolating network of Fig. 7. In describing that network, it was shown that for a percentage figure of 100 the following terminals were connected in pairs: 171 and 174, 172 and 174, and 173 and 175. Accordingly, when commutator switch 190 engages its "0" contact, a low voltage will be applied to the units and tens indicating strobotrons, and they will both fire at the instant in which those digits appear below the units and tens viewing windows on the indicator cylinder, as timed by the closing of switch 186. Similarly, the hundreds indicating strobotron will fire an instant later when the commutator switch 190 engages its "1" contact and switch 186 is closed, at which time the numeral 1 on the cylinder will be below the hundreds viewing window. Each tube will continue firing at each periodic revolution of the cylinder, and the numeral 100 will appear, through persistence of vision, to be stationary.

Automatic keycard circuit

The automatic keycard circuit shown in Fig. 11 is adapted to be connected to the correct response circuit of Fig. 3 for the purpose of inserting correct response data in the latter circuit by means of a pre-punched card. The use of the automatic keycard circuit is optional and takes the place of manually inserting correct response data in the system by pushing in the correct response keys A1, B1, and C1, the operation of which have been previously described in connection with Fig. 3.

When the automatic keycard circuit is to be used, manual switch 43 in Fig. 3 is set in its lower position connecting relays 49, 50, and 51 with the output terminals 44, 45 and 46, respectively. It will be noted that those same terminals are shown at the top left of Fig. 11.

Referring to Fig. 11, when a reset switch R is closed, it resets the stepping switches T1 and T2 to their initial positions shown in Fig. 11. For example, if wiper arm 196 of stepping switch T1 is in any other position than the "100" position shown, then the mechanically linked wiper arm 192 of stepping switch T2 will engage one of the electrically interconnected contacts of that switch. Battery current will accordingly flow through wiper arm 192 and through whatever contact that arm engages to the reset switch R. Since that switch is closed, battery current will flow through normally closed contact 193 to the coil of a stepping relay 194. As that coil is energized, it moves the linked wiper arms 192 and 196, through conventional ratchet means, not shown, one position in a counter-clockwise direction. At the same time, contact 193 is opened, breaking the energizing circuit to the coil of relay 194, and that relay will release, resetting the ratchet. As it releases, its contact 193 closes, again energizing the relay coil, so that the previous cycle is repeated as many times as may be necessary to return the wiping arms to the vertical positions that they occupy in Fig. 11. Arm 192 will then engage contact 195, which is not connected to any other circuit, thereby interrupting the flow of battery current to reset switch R and the resetting relay 194. Switch R may then be opened.

The foregoing resetting operation is performed before the beginning of the first response period. Thereafter, each time the response period switch 1 in Fig. 1 is closed, a battery pulse is delivered from battery Y2 through momentarily closed contact 7 of clearing relay 6 and terminal 47 to stepping relay 194. The latter relay will then advance the switch arms of stepping switches T1 and T2 one position. In other words, those wiper arms are moved one position to engage a new contact at the beginning of each response period. As wiper arm 196 rotates from one position to the next, it delivers a ground pulse to each of the separate conductors connected to each of the successive contacts that it engages. Those conductors are each connected to one of the terminals 44, 45, or 46, representing one of the alternate correct responses that may be inserted in the correct response circuit of Fig. 3, the connection being made through a hole in a pre-punched card 197. The holes are so punched in the card that each successive control of switch T1 will insert the correct response in the system for each successive question that is to be given the group. According to the holes punched in the top portion of the card 197 that is shown in Fig. 11, the correct response to the questions put at the beginning of successive response periods are response B, response A and response C.

Response period timer

The timer circuit shown in Fig. 12 may be operated either manually or automatically. In the former case, it merely times the duration of the response period, indicating elapsed time at the end of that period when the response stations are locked. In its automatic operation, the desired duration of any response period is preset into the timer, which will then automatically lock the response stations when the preset time has elapsed. If desired, the timer is also adapted to give a warning signal a preset number of seconds before the response stations are locked.

When using the timer circuit for controlling the beginning and ending of the response period, switch 1 in Fig. 1 is left open, and a timer switch 199 in that figure is moved from the position shown to engage its upper contact, which is connected to a terminal 198. That same terminal appears on the lower left of Fig. 12. A second switch 200 (near the upper left corner of Fig. 12) will now function as the manually controlled response period switch of the system.

When the timer is to be used like a stop watch, merely to measure elapsed time during the response period, a control switch 201 (on the left side of Fig. 12) is placed in the manual position so that one of its switch arms engages contact 222. When response periods switch 200 is in its response period position, as shown in the drawing, its contact 202 is closed, which in turn closes a series circuit including a source of alternating current, a normally closed contact 203 and a synchronous motor 204, the output shaft of which is rotated at 1 R. P. S. That motor drives a cam 205, which opens and closes contacts 206 and 207 once each second, thereby delivering ground pulses one second apart through contact 206 to a conductor 208. A manual control switch 209 is connected to that conductor and transmits, when the switch is closed, the one second ground pulses through a normally closed contact 210 to the coil of a stepping relay 211, which is also connected to battery. Relay 211 operates two wiper arms 212 and 213, moving each of them one position each time it is energized, i. e., every second. As indicator wiper arm 213 advances from contact to contact, it lights in sequence the numbered indicator lamps that are shown connected to its successive contacts, thereby visibly indicating elapsed seconds of time. On the tenth pulse to stepping relay 211, control wiper arm 212 mechanically closes a spring return switch 214 to transmit a battery pulse to the coil of a resetting relay 215, which causes both wiper arms 212 and 213 to return to their initial positions shown and repeat the cycle previously described.

As the "seconds" wiper arms 212 and 213 are reset to their initial positions by resetting relay 215, the same battery pulse that energizes that relay is also transmitted through a normally closed contact 216 to another stepping relay 217, which in turn advances wiper arms 218 and 219 one position. It will be apparent that the latter arms measure and indicate tens of seconds of elapsed time in the same way as arms 212 and 213 measure and indicate units of seconds. On every sixth pulse to stepping relay 217 (i. e., after each minute of elapsed time), wiper arm 218 mechanically closes a spring return switch 220, causing a battery pulse to be delivered through that switch to a second resetting relay that resets the "tens seconds" wiper arms. That same pulse is also delivered through a normally closed contact of a clearing relay 223 to a third stepping relay, which operates two switch arms similar to those previously described for measuring and indicating minutes of elapsed time.

When the instructor throws switch 200 to lock stations, contact 202 is opened, thereby opening the motor circuit, and the motor stops. However, it does not stop until cam 205 has opened contact 207, because that contact, when closed, provides an alternate closed motor circuit. In other words, the motor cannot stop with contacts 206 and 207 in their closed positions. With the stopping of the motor and the opening of contact 206, no further pulses are delivered to the stepping relays in the timer circuits. The elapsed time from the beginning of the response period to the end of that period will now be shown by the indicating lamps associated with the stepping relays.

When switch 200 is moved from its lock station position to its response period position it energizes the response period relay 2 in Fig. 1 and causes a pulse of current to flow through momentarily closed contact 7 of clearing relay 6 and terminal 47 to contact 222 of switch 201 in Fig. 12, which is assumed to be in its normal position. Accordingly, the pulse wil be transmitted through contact 222 to the coil of a clearing relay 223, which will be momentarily energized. As each of its four armatures moves down, current from a battery Y10 is transmitted to each of the resetting relays in Fig. 12, returning all of the wiper arms to their initial positions.

If switch 201 is set in its automatic position (the position shown in Fig. 12), rotary tap switches 224, 225, and 226 are preset to measure the desired duration of the response period. Those tap switches, as will be clear from Fig. 12, are adapted to engage contacts electrically connected to the wiper arm contacts measuring seconds, tens of seconds, and minutes. In addition, tap switches 225 and 226 are electrically connected to wiper arms 227 and 218, respectively. Accordingly, there will be a closed circuit from wiper arm 212 through tap switch 224 whenever each wiper arm 212, 218, and 227 engages a contact electrically connected to the corresponding preset tap switch. Switch 200 is then moved to its response period position to begin the response period, and elapsed time is measured and indicated as previously described. However, when the preset time indicated by the rotary tap switches has elapsed, the positions of the wiper arms 212, 218, and 227 will coincide with those of the preset tap switches, and current from a battery Y11 will be routed, as previously indicated, through arm 212, switch 226, arm 218, switch 225, arm 227, and switch 224 to contact 228 of switch 201. From there, the battery pulse is delivered to the coil of a warning relay 229, which will be energized, opening its contact 210 to disconnect the stepping relay 211 from the seconds impulse circuit produced by the rotation of cam 205; but the operation of relay 229 is so rapid that a residual portion of the last pulse in that circuit is routed to a stepping relay 233, which moves its wiper arm 234 to its first contact, ringing a bell. The opening of contact 210 stops further operation of the wiper arms 212, 218, and 227. If warning tap switch 230 (near the right hand side of Fig. 12) has been preset to zero seconds as shown in the drawing, the same battery current that energized relay 229 will also be delivered through tap switch 230 to the coil of a control relay 231, which will be energized and open its contacts 203 and 232. As previously described, the opening of contact 203 stops the rotation of motor 204. The opening of contact 232 of relay 231 disconnects battery Y9 from terminal 198 and locks all of the response stations.

If the warning tap switch 230 has been preset in some other position than the zero position shown, as for example, to give five seconds warning, then the closing of relay 229 would route the one second pulses produced by motor 204 to stepping relay 233. The first such pulse would advance wiper arm 234 one position, ringing the bell while doing so. After five such routed pulses, wiper arm 234 would engage the "5 second" contact opposite to and interconnected with that engaged by tap switch 230, so that current from battery Y12 would flow through wiper arm 234 and tap switch 230 to energize relay 231, locking the response stations and stopping the motor, as previously described.

In order to begin the next response period, switch 200 is momentarily placed in the lock station position so that battery will then flow through the lower pole of switch 200, through switch 201, to relay 223, which operates, resetting all the stepping switches to zero as described previously. Then, when switch 200 is returned to the response period position, the automatic operations previously described will be repeated.

*Response printing circuit*

It is frequently desirable to make a printed record of each response that is made at each response station just before the stations are locked at the end of each response period. The electrical circuit and apparatus for carrying out this function is shown in Fig. 13.

The numerous coils shown at the left-hand side of Fig. 13 represent a plurality of solenoids, each of which when energized, causes a line to be traced at a different position on a moving web of paper 240. The printing mechanism by which that is done is shown diagrammatically in Fig. 13 and is more fully described in the copending application of Frank T. John and John B. Cannon, Jr., applicants herein, Serial No. 280,406 now Patent No. 2,625,459; and so will be described only briefly here. One solenoid 247 is illustrated in the diagrammatic view of this mechanism at the top right of Fig. 13; its armature 236 supports a resilient printing wire 237, the upper end of which is free to vibrate and is normally held in spaced relation from an inked ribbon 239, which is interposed between the printing wire and the paper, and also from a rapidly rotating cam 238. When solenoid 247 is energized its armature lifts the wire into impact engagement with the cam, so that the upper end of the wire vibrates rapidly and strikes repeated blows against the inked ribbon, causing an inked trace to be made on the paper underneath, while the paper moves at a uniform speed between its supply and take-up rolls. The blows of the printing wire are delivered so rapidly that the series of overlapping traces made on the paper merge into a continuous straight line. It will be understood that there are a plurality of such printing wires, each being lifted into and lowered out of engagement with the impact cam by one of the solenoids shown on the left-hand side of Fig. 13 whenever that solenoid is energized and de-energized, respectively.

Three of the solenoids shown in Fig. 13 are connected to terminals 241, 242, and 243. Those same terminals are connected to ground through the energizing circuits of the correct response relays 52, 53, and 54, respectively, in Fig. 3. Accordingly, at the end of each response period, and after correct response data have been inserted in the system, one of those three solenoids in the printing circuit will be energized (depending on which correct response relay has been energized), and will mark a trace on the web of paper indicating the correct response to the preceding question.

A fourth solenoid, shown at the left-hand side of Fig. 13 is connected to a terminal 235, which (see Fig. 12) receives one second ground pulses through contact 206, which is opened and closed every second by cam 205. Accordingly, the solenoid connected to terminal 235 will mark a one second interval time trace on the paper during the response period, when the timer motor 204 in Fig. 12 is operated, thereby indicating the duration of each response period and the length of the interval between successive periods.

A fifth and sixth solenoid shown in Fig. 13 are connected to terminals 244 and 245, respectively. Those terminals are provided for receiving pulses from an external source to mark film footage, when the group under observation is being shown a film and their responses during its showing are used to evaluate the film.

The next two solenoids shown on the left-hand side of Fig. 13 are connected to terminals 246 and 247, and to the response station of individual X in Fig. 1. There is a similar pair of solenoids for each of the other response stations. Referring to Fig. 1, terminals 246 and 247, are shown to be connected in a coding circuit operated by the memory relays MA, MB, and MC. This coding circuit and its associated solenoids operate as follows. If individual X has made an A response, his memory relay MA will be energized and its upper switch 300 will be closed. A ground pulse will then flow through that closed switch and through terminal 246 to solenoid 301, which will be energized and will print an appropriate trace on the web of paper 246. If individual X had made a B response, memory relay MB would be energized and its two upper switches 302 and 303 would be closed, transmitting a ground pulse to both terminals 246 and 247 to energize both of the solenoids 301 and 304, thereby printing a double trace on the web of paper. If individual X has made a C response, memory relay MC would be energized and its upper switch 305 would be closed, transmitting a ground pulse to terminal 247, which would energize solenoid 304 alone and print a single trace on the paper in a different position than the trace made when solenoid 301 was alone energized. Accordingly, the response that was made by individual X to any given question can be determined from the printed record that is made on the moving web of paper 249.

Three of the remaining solenoids shown at the top left of Fig. 13 are associated with a continuously running timer, represented by a one R. P. M. synchronous motor 248 and the three cams rotated by that motor; the left-hand cam opens and closes a switch 249 once each second; the middle cam opens and closes a switch 250 once every ten seconds; and the right-hand cam opens and closes a switch 251 once every minute. Each of those switches is connected to a separate solenoid, which will be energized each time its switch is closed and will print elapsed timing on the web of paper.

The last two solenoids at the left top of Fig. 13 are each connected to one of the manual switches 252 and 253, which are of the three position, spring return to neutral type. They provide a convenient means for the instructor to make notes (according to his own code) on the moving web of paper concerning the progress of the test, etc. When either switch is in its upper position, its associated solenoid will cause a solid line to be traced on the paper. If either switch is in its lower position, its associated solenoid will cause a broken line to be traced on the paper, because the solenoid circuit to ground is periodically interrupted by the opening and closing of a switch 254 operated by a cam attached to a drive roll DR that moves the paper. In other words, when the paper moves a certain distance switch 254 will be closed, permitting each solenoid to print a solid line; but when the paper moves a further distance, the switch will be open, and no mark at all will be printed by either solenoid.

The inked ribbon 239 that is used in the printing mechanism of Fig. 13 is operated by the reversible drive mechanism shown in Figs. 14 and 15. One of the spools used for winding and unwinding the ribbon is rigidly attached to a shaft rotated by a reversible motor K, through appropriate gear reductions not shown in the drawings. The other spool is connected to the same shaft through a take-up coil spring L. That spring compensates for the changing diameter of the winding and unwinding spools, and also supplies proper tension to the ribbon. As each spool is unwound, a portion of the ribbon near the end of that ribbon where it is attached to the spool is provided with a conductive coating, or a metal rivet or other conducting means for closing an electrical circuit through one of the contacts N1 or N2. From the wiring diagram of Fig. 15, it will be clear that when either of those contacts is closed, one of the coils H1 or H2 of a latching relay P will be energized and will shift the latching armatures to reverse the rotation of motor K. It is a characteristic of the latching relay P that its armatures will remain in one of the relay energized positions after the relay is released by the opening of contact N1 or N2, until the relay is again energized by the closing of one of those contacts, shifting the armatures to a new position. It will be apparent that this arrangement eliminates the reversing gears usually associated with the ribbon drive of a typewriter, or other printer using a typewriter ribbon.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Response indicating apparatus comprising a plurality of manual response keys that are adapted to be selectively moved to indicate the choice of one response among a plurality of alternative responses, an electrical circuit, a plurality of response relays equal in number to the number of response keys, each relay being associated with a different response key and including switch means that may be independently shifted by its associated key, the relays being so interconnected through their respective switch means to a source of current supply that when any one of the keys is depressed its associated relay will be energized and will lock in holding circuit connection until the depressing of a different key unlocks and releases said relay and at the same time energizes and locks in holding circuit connection its own associated relay, whereby if successive alternative responses are made by depressing different keys only the last response made will remain.

2. Response indicating apparatus comprising a plurality of manual response keys, each of which may be selectively depressed to indicate a particular response among a plurality of alternative responses, an electrical circuit, a response relay associated with each response key and energizing the electrical circuit only when that key is depressed but remaining energized in holding circuit connection after that key is released, switch means associated with each response key and its corresponding response relay and so interconnected that when any response key is depressed its associated switch means will unlock and disconnect the other relays from the holding circuit and at the same time will energize its associated response relay and lock it in that circuit.

3. A classroom communicator for indicating the response of each individual in a group to a given event, where each individual has a choice of one response among a plurality of alternative responses, comprising a plurality of response stations, one for each individual whose responses are being elicited, each response station including a plurality of response keys adapted to be manually depressed, there being as many such keys as there are alternative responses, a plurality of response relays in each response station, there being one such relay associated with each response key of that station and energized when that key is depressed, the response relays in each station being so interconnected in an electrical circuit that only one response relay can be energized in any response station at any one time and when energized locks itself into a holding circuit connection until unlocked and released by the subsequent energization of another response relay in the station when a different response key is depressed to indicate a change of response, a plurality of memory relays in each response station, there being one memory relay associated with each response relay and energized and remaining energized whenever its associated response relay is energized, control means associated with the electrical circuit for locking the response and memory relays in each response station at a predetermined time, after which an individual can not change his response or manifest one where none has been manifested before, and indicating means for indicating the response, if any, manifested in each response station.

4. A classroom communicator in accordance with claim 3 that includes the following additional elements: a correct response input circuit for inserting correct response data in the system, said circuit comprising a plurality of interconnected correct response relays, a separate score indicator associated with each response station, switch means controlled by each correct response relay for routing an electrical pulse to those score indicators that are associated with each response station in which a correct response has been manifested.

5. A classroom communicator in accordance with claim 3 that includes the following additional elements: a multiple weighting circuit for weighting the possible alternative responses in accordance with a predetermined code of numerical weights, said circuit comprising a plurality of pulse generating means each generating a different number of pulses, coding relay means for routing the pulses from said generating means through each response station, a score counter associated with each response station for receiving said routed pulses in accordance with the response manifested at that station.

6. A classroom communicator in accordance with claim 3 in which the following additional elements are included: a plurality of rotary commutator scanning switches, there being one such switch for each possible response manifestation, including the failure to make any response at all, each commutator switch being provided with as many contacts as there are response stations in the system, each contact of any one commutator switch being adapted to be connected to an electrical circuit through the memory relays of a different response station wherever those relays have assumed a unique configuration corresponding to one of the possible response manifestations, whereby each commutator switch will receive a series of electrical pulses as each of its contacts is scanned whenever the contact is connected to a response station in which the memory relays have assumed said unique configuration, and a numerical counter for counting the pulses received by each of the commutator switches.

7. A classroom communicator according to claim 6 that includes the following additional elements: a translating and interpolating circuit for receiving electrical count data from said counter, said circuit including a network of interconnected relays adapted to assume a unique configuration for each possible count of said counter, the circuit also including a plurality of interpolating relays, there being one relay for each possible count of said counter, one of said relays being selectively energized in accordance with the configuration of said relay network, the circuit further including an interchangeable interpolating network through which pre-wired electrical connections are made in unique configuration depending upon which of the interpolator relays has been energized, the interpolating network being prewired so as to perform mathematical operations involving the counting data transmitted by said counter, and electrical indicating means connected to said interpolating network for indicating the result of said mathematical operations.

8. A classroom communicator according to claim 3 that includes the following additional elements: a keycard correct response circuit including an interchangeable keycard having prewired electrical configurations thereon in sequence corresponding to the correct responses to a sequential series of questions and stepping switch means for transmitting correct response electrical configuration data to other circuits in the system.

9. A classroom communicator in accordance with claim 3 that includes the following additional elements: a plurality of scanning keys adapted to be manually operated, there being one such key for each possible alternative response, an individual response indicator associated with each response station, a scanning circuit that includes the memory relays and the individual response indicator associated with each response station and that also includes the scanning keys, said circuit being closed and the response indicator associated with any specific response station being operated whenever the particular scanning key that is operated identifies the particular alternative response that is also manifested by the configuration of the memory relays in the specific response station.

10. A classroom communicator according to claim 3 that includes the following additional elements: a timer circuit for timing the duration of any response period, during which the individuals of the group under observation are permitted to manifest their choice of responses and to change their choices, and for limiting the response period to a predetermined time, said timer circuit comprising a time pulse generating means for generating electrical pulses at periodic intervals, time presetting switches for presetting the duration of a response period, time measuring switches for measuring elapsed time and operated by pulses from the time pulse generating means, conductor means for interconnecting the preset time switches and the time measuring switches when the elapsed time is equal to the preset time, thereby closing an electrical circuit for locking all the response stations.

11. A classroom communicator according to claim 3 that includes the following additional elements: a printing mechanism for recording the responses manifested at each response station, said mechanism including a plurality of printing means for each response station, each of said means corresponding to one of the possible alternative responses that can be manifested, electromagnetic means for selectively operating said printing means in accordance with the response manifested in each response station.

12. A classroom communicator according to claim 11, in which said printing mechanism includes an inked ribbon adapted to be wound back and forth between two ribbon-carrying spools, one of said spools being rigidly attached to a rotatable shaft, the other spool being rotatably connected to the same shaft through a coil spring for compensating for changes in the diameter of each ribbon-carrying spool as the ribbon is wound on and unwound from that spool, means for rotating the shaft in either direction, and electromagnetic means for reversing the direction of rotation of the shaft when a predetermined amount of ribbon has been unwound from one of the spools.

13. Response indicating apparatus according to claim 1, in which means are provided for normally holding each response key in a raised position and for restoring the key to that position after it has been released from a depressed position, said means including a fulcrum spaced from the key and a loaded spring member having one end engaging the fulcrum and the other end engaging the key, the fulcrum being so positioned relative to the key that the loaded spring exerts a maximum component of force in a direction to raise the key when the key is up and a minimum component of force in that same direction when the key is down.

14. Response indicating apparatus according to claim 1, in which means are provided for normally holding each response key in a raised position and for restoring the key to that position after it has been released from a depressed position, said means including a pivoted arm connected to the key and rotatable when the key is moved, a fulcrum spaced from the arm, a compressed spring member having one end engaging the arm and the other end engaging the fulcrum, the fulcrum being so positioned relative to the arm that the point of engagement between the spring and the arm will when the key is down be close to but to one side of an imaginary straight line connecting the center of rotation of the arm with the fulcrum at the point where it is engaged by the spring and when the key is up will be displaced a greater distance from said line upon the same side thereof, whereby the force of the spring tending to raise the key decreases to a minimum as the key is depressed.

15. Response indicating apparatus comprising a plurality of manual response keys that are adapted to be selectively moved to indicate the choice of one response among a plurality of alternative responses, an electrical circuit, a plurality of response relays equal in number to the number of response keys, each response relay being associated with a different response key and having an energizing coil and switch means controlled thereby, the switch means being adapted to assume an energized position when the coil is energized and a released position when the coil is deenergized, means connecting each response key with the switch means of its associated response relay so that when any key is depressed the switch means connected thereto will assume its energized position, means for normally holding each switch means in its released position, each coil being connected in the electrical circuit and being energized thereby through its own switch means in its energized position and through the switch means of the other relays in their released positions, whereby when any key is manually depressed the switch means associated with that key will assume its energized position thereby energizing its associated coil and locking itself in its energized position and at the same time deenergizing any other coil that has been previously energized to release the switch means and key associated with the latter coil.

16. Response indicating apparatus according to claim 15 that includes the following additional elements: a plurality of memory relays, there being one memory relay associated with each response relay, each memory relay having an energizing coil and switch means controlled by the coil, the switch means being adapted to assume an energized position when the coil is energized and a released position when the coil is deenergized, the coil of each memory relay being connected in parallel with the coil of its associated response relay so that when any response relay is energized its associated memory relay will also be energized, control means for opening the electrical circuit that initially energizes the response relays and for closing at the same time an electrical circuit that includes the coil of any memory relay that is already energized and the switch means of that relay in its energized position, whereby when the control means is operated the coils of any memory relay and its associated response relay that were already energized will remain energized but no other response relay coil can be energized by depressing its associated key.

17. A classroom communicator for indicating the response of each individual in a group to a given event, where each indivdual has a choice of one response among a plurality of alternative responses, comprising a plurality of response stations, one for each individual whose responses are being elicited, each response station including a plurality of response manifestation means adapted to be selectively operated by the individual at that station to indicate his choice of response, there being as many such means as there are alternative responses, relay means associated with each response station and adapted to assume a unique configuration for each possible response manifestation at that station, a plurality of response scanning means adapted to be successively connected with each response station, there being one such scanning means for each possible response manifestation, each response scanning means being adapted to close an electrical circuit and to generate a pulse of current when connected with any response station where the relay configuration in that station corresponds to a particular response manifestation, and a numerical counter for counting the pulses received by each of the response scanning means.

References Cited in the file of this patent

UNITED STATES PATENTS

| | | |
|---|---|---|
| 987,637 | McBerty | Mar. 21, 1911 |
| 1,514,954 | Crumpton | Nov. 11, 1924 |
| 1,841,170 | Chase | Jan. 12, 1932 |
| 2,654,163 | Reynolds | Oct. 6, 1953 |